United States Patent [19]

Smith, III et al.

[11] Patent Number: 5,483,052
[45] Date of Patent: Jan. 9, 1996

[54] SYSTEM FOR READING, STORING AND USING BAR-ENCODED DATA FROM A CODED BUSINESS CARD OR OTHER PRINTED MATERIAL

[76] Inventors: Herbert J. Smith, III, 9090 Eaton Park Rd., Great Falls, Va. 22066; Thomas G. White, Jr., 2309 Popkins La., Alexandria, Va. 22306

[21] Appl. No.: 162,626

[22] Filed: Dec. 7, 1993

[51] Int. Cl.$^6$ .................................................. G06K 7/10
[52] U.S. Cl. ............................................ 235/472; 235/380
[58] Field of Search ...................................... 235/472, 462, 235/380, 487, 375

[56] References Cited

U.S. PATENT DOCUMENTS

| | | | |
|---|---|---|---|
| 4,272,327 | 6/1981 | Logan | 283/1 B |
| 4,465,926 | 8/1984 | Apitz | 235/472 |
| 4,654,793 | 3/1987 | Elrod | 364/401 |
| 4,817,136 | 3/1989 | Rhoads | 379/357 |
| 4,945,218 | 7/1990 | Talbott | 235/487 |
| 4,945,219 | 7/1990 | Tanaka | 235/488 |

FOREIGN PATENT DOCUMENTS 2242162  9/1991  United Kingdom ................. 235/375

OTHER PUBLICATIONS

"Packing a Page of Info Into Two Inches" by Kevin R. Sharp, COMPUTERWORLD, May 25, 1992, In Depth: Big Bad Bar Code, p. 83.

"How to Organize Business Cards", NATION'S BUSINESS, Dec. 1993, Hardware p. 48.

*Primary Examiner*—Donald T. Hajec
*Assistant Examiner*—Karl D. Frech
*Attorney, Agent, or Firm*—Shlesinger Arkwright & Garvey

[57] ABSTRACT

A system for reading, storing and using data from a business card or other printed material comprises a business card or other printed material having high density bar-encoded data imprinted thereon, the data being divided into discrete fields; a bar code reader adapted to read the bar-encoded data; and a computer coupled to the reader for storing and manipulating the data with respect to the fields.

11 Claims, 2 Drawing Sheets

SYSTEM FOR READING, STORING AND USING BAR-ENCODED DATA FROM A CODED BUSINESS CARD OR OTHER PRINTED MATERIAL

FIELD OF THE INVENTION

The present invention relates generally to a bar code reader and particularly to a system for reading, storing and using bar-encoded data from a coded business card or other printed material, such as advertisements, brochures, articles, etc.

BACKGROUND OF THE INVENTION

When one attends a business meeting, convention or any business related gathering, it is common practice to exchange business cards with people one meets. At the end of such meetings, one would typically have a stack of such business cards from individuals with information on each individual such as name, title, affiliation, address, telephone number, facsimile number and some other information that each individual may choose to include. To keep track of the contacts made, one would input the data from the cards into a computer with the appropriate software.

Inputting is normally done manually through a keyboard, which is time consuming and prone to human errors.

Where the business cards are not inputted into a computer, they are typically organized in a storage box. When there are hundreds of these calling cards, manual sorting and searching is time consuming.

During a business trip, one typically spends relatively large amount of time in airports and in the air. During this time, it is not unusual for one to pass the time by reading magazines, newspapers or other written materials, since the airlines make them readily available. While leafing through these magazines, one would normally come across an interesting advertisement or article to which one would desire to refer at a later time. Typically, one would write down the necessary information, such as, in the case of an advertisement, the item description, manufacturer's or dealer's address, cost, etc. In some cases where mail-in cards are provided, one would normally tear out the cards, check off the desired items and set them aside for later mailing. After the trip, one would organize the notes he had up picked from the magazines or the like to determine which ones to act on, such as requesting additional information from the manufacturer or author. However, what typically happens later on is that the notes or cards are misplaced or forgotten, losing the valuable information.

There is therefore a need for a system that can read and store bar-encoded data from a business card or other printed materials such as advertisements, articles, etc. that eliminates the above-mentioned problems.

OBJECTS AND SUMMARY OF THE INVENTION

It is an object of the present invention to provide a business card or other printed materials such as advertisements, etc. with bar-encoded data.

It is another object of the present invention to provide a system for reading and storing into a computer bar-encoded data from a business card or other printed materials such that the data may be manipulated and sorted electronically.

It is still another object of the present invention to provide a system for reading and storing into a computer bar-encoded data from a business card or other printed materials that organizes the data by fields.

It is yet another object of the present invention to provide a pen-shaped bar code reader with built-in memory that a person can conveniently carry to gatherings or business trips to read bar-encoded data from business cards and other printed materials.

It is another object of the present invention to provide a business card and other printed materials that are imprinted with a two-dimensional bar code containing a plurality of data fields, such as a person's name, title, affiliation, address, voice telephone number, facsimile telephone number, manufacturer's address, description of the item advertised, price, etc.

In summary, the present invention provides a system for reading, storing and using bar-encoded data from a coded business card or other printed materials such that manual inputting of the information and storage of the information are eliminated.

These and other objects of the present invention will become apparent from the following detailed description.

BRIEF DESCRIPTIONS OF THE DRAWINGS

DETAILED DESCRIPTION OF THE INVENTION

Figure 1:
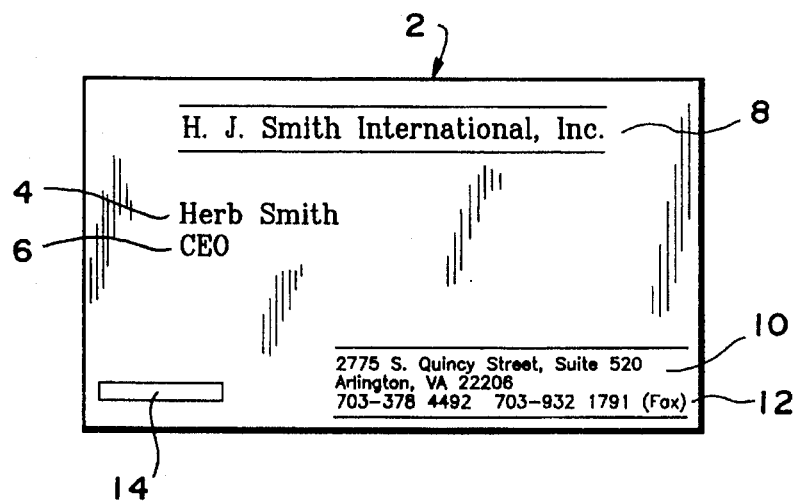
FIG. 1 shows a business card with bar-encoded data in accordance with the present invention.

A business card 2 printed in accordance with the present invention is disclosed in FIG. 1. The card 2 has several imprinted information pertaining to the card owner's name 4, title 6, affiliation or company name 8, address 10 and telephone numbers 12. These data are encoded in a bar code 14 on the face of the business card 2. The bar code 4 is a high density, two-dimensional bar code to advantageously accommodate the imprinted information in a small area, without detracting from the textual materials printed on the card 2 and affecting its overall aesthetic appearance. A two-dimensional bar code can store about 100 times more information than a one-dimensional bar code typically used in the supermarket. The standard one-dimensional bar code can only hold up to 20 or 30 characters per inch, making it unsuitable for encoding all the information typically found on a business card. As an illustration, the information imprinted on the business card 2 would require an approximately six inch long one-dimensional bar code, which would not be visually appropriate for a typical business card measuring 1½"×3". In contrast, encoding the information on the business card 2 using a two-dimensional bar code would require substantially much less space. Thus, the bar code 14 can be disposed in an unobtrusive corner of the business card 2.

Figure 2:
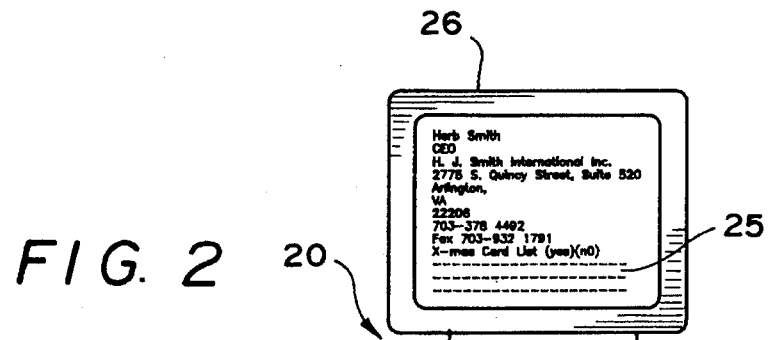
FIG. 2 is a perspective diagram of a system for reading, storing and using the bar-encoded data from the business card of FIG. 1.
Figure 3:
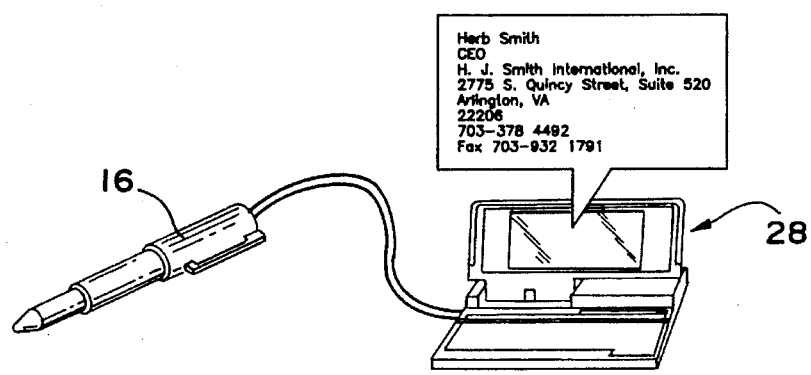
FIG. 3 is a perspective diagram of another embodiment of the system of FIG. 2, utilizing a personal electronic organizer.

The bar code 14 is scanned by a light pen or scanner 16, which is coupled to a bar code reader 18, which in turn is coupled to a computer 20 configured to receive, store and manipulate the data contained in the bar code 14, as best shown in FIG. 2. The scanner 16 reads the bar code 14 row by row in a downward zig-zag pattern, similar to a television picture tube raster pattern. The scanner 16 is a high speed laser that advantageously reads the two-dimensional bar code just as quickly as an ordinary scanner deciphers a conventional bar code. The light reflections received by the scanner 16 is converted by bar code reader 18 into binary digits, which are then fed to the computer 20. The data is stored in a hard disk 22 or a floppy disk 24. The computer includes an application software, such as a database management software, to enable the user to manipulate the stored information and output useful reports. The software advantageously allows the user to input additional personal or other information in open fields 25 not provided in the encoded data 14. A monitor 26 displays the data in a format or report preselected by the user through a keyboard (not shown). The computer 20 can manipulate the data by field dependent upon user requirements or search the database for specific information. Once the information is loaded into the computer 20, the information can be edited, such as adding or deleting fields.

The computer 20 is a standard personal computer, such as an IBM-Compatible computer.

Figure 4:
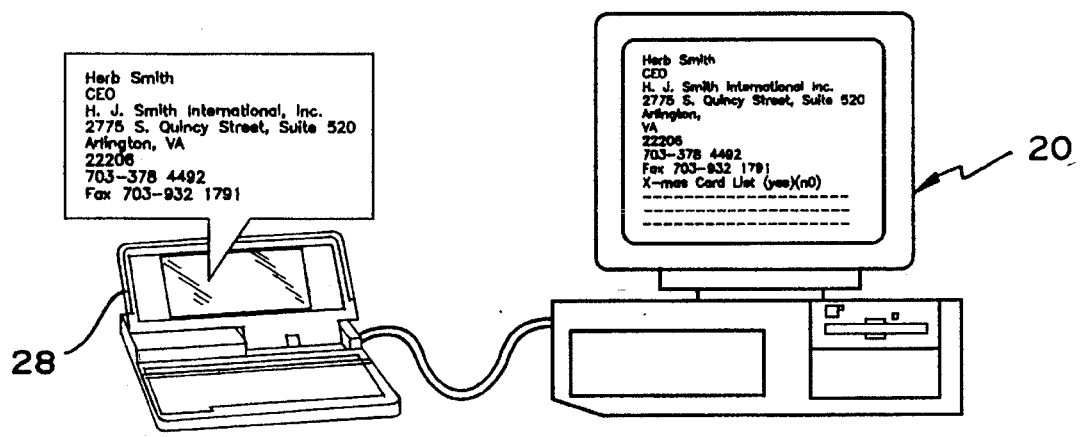
FIG. 4 is a perspective diagram showing the personal electronic organizer of FIG. 3 being downloaded to a personal computer.

The scanner 16 may also be coupled through an electronic personal organizer 28, such as the Sharp Wizard electronic organizer that includes a telephone directory software. The personal organizer 28 is configured to decode the bar code 14 and convert the data into field delineated format. The portability of the personal organizer 28 and the scanner 16 advantageously permits the user to collect the information from the card 2 without waiting until one gets back to the office. This advantageously provides for quick access to the collected data. The information stored in the personal organizer 28 may be downloaded to the computer 20, as best shown in FIG. 4.

Figure 5:
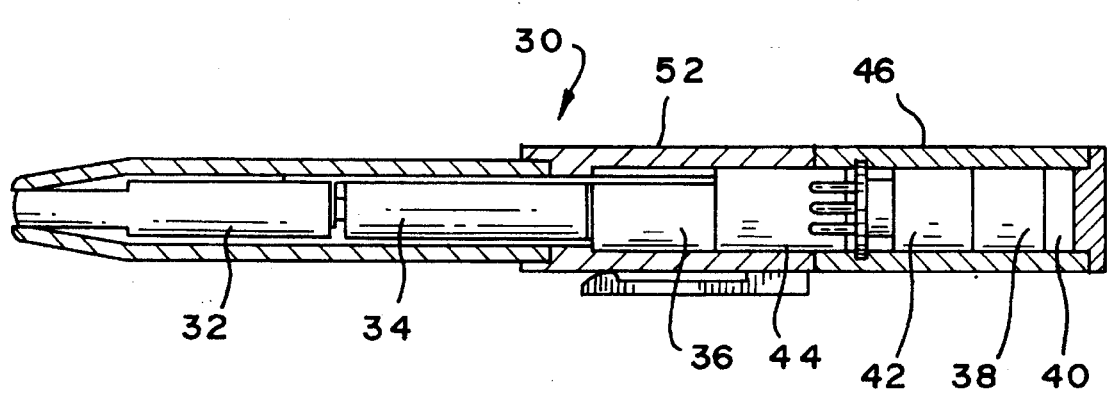
FIG. 5 is cross-sectional schematic view of a portable bar code reader.
Figure 6:
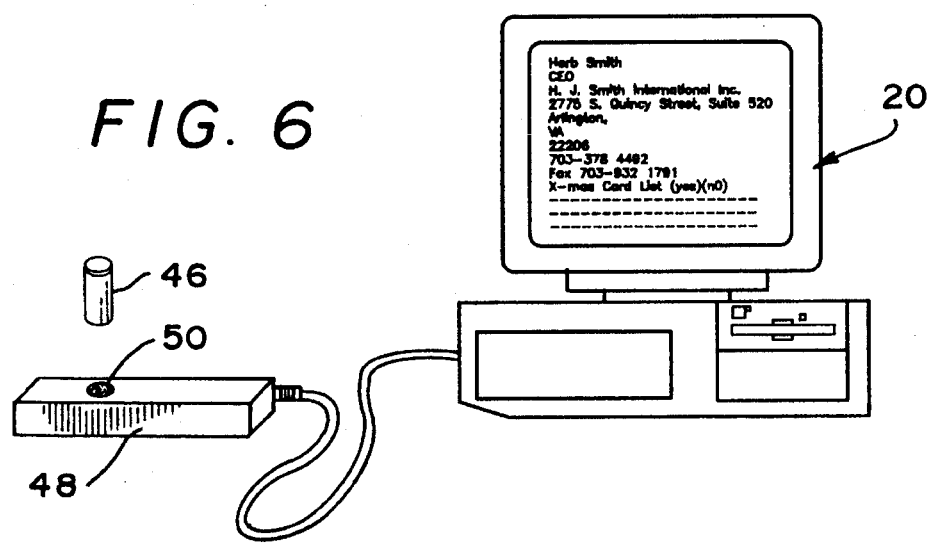
FIG. 6 is a perspective view of a system for downloading data stored from the bar code reader of FIG. 3 to a personal computer.

A portable bar code reader 30 is disclosed in FIG. 5. The reader 30 includes a light source/detector 32 powered by battery 34. The light detector 32 is fed to a converter 36 that converts the light reflections into binary digits. The data is then stored in a RAM chip 38 powered by battery 40. Interface units 42 and 44 direct the mode of operation of the reader 30. When a removable cap 46 is plugged into interface unit 44, the reader 30 is configured to read bar encoded data, as best shown in FIG. 5. When the removable cap 46 is unplugged from the interface unit 44, and then plugged into a download device 48, information stored in the RAM chip 38 is downloaded to the computer 20, as best shown in FIG. 6. The download device 48 has socket 50 for receiving the cap 46. The battery 40 is advantageously disposed within the cap 46 such that the RAM chip 38 is continuously powered even when the cap is separated from the housing 52.

The reader 30 is advantageously sized as a standard pen housing 52 that fits conveniently in a shirt pocket. This allows the user to readily collect data from a business card as it is presented. In this manner, the business card does not have to be given away. After the information is scanned by the reader 30, the business card may then be returned to the owner. When used in conjunction with the reader 30, the business card 2 can be made of durable material such as plastic since it would not be intended to be given away, but simply presented for scanning. The pen-shaped reader 30 further advantageously assures that the reader 30 is only a shirt-pocket away for spur-of-the-moment use, such as reading encoded data from advertisements or other printed material while leafing through such materials.

The data on the business card 2 may also be encoded on a magnetic strip, in which case a magnetic reader would be used.

Although the present invention has been illustrated using a business card, it should be apparent that the present invention is equally applicable to any printed materials, such as advertisements, articles, etc. with bar-encoded data.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A system for reading and storing data from a business card, comprising:
   a) a business card having printed business data and a bar code containing said business data, said data being divided into discrete fields;
   b) a portable bar code reader adapted to read said bar code;
   c) a computer coupled to said reader for storing and manipulating said data with respect to said fields and providing an output report;
   d) said reader including means for storing and downloading the read data to said computer;
   e) said reader is pen-shaped having a removable cap; and
   f) said cap including said storage and downloading means.

2. A system as in claim 1, wherein:
   a) said bar code is two-dimensional.

3. A system as in claim 1, wherein:
   a) said bar code is disposed on one corner of said business card.

4. A system as in claim 1, wherein:
   a) said business data includes at least a person's name, address and telephone number.

5. A system as in claim 1, wherein:
   a) said business card is made of plastic.

6. A system as in claim 1, wherein:
   a) said computer is a personal electronic organizer.

7. A method for collecting data from a printed material, comprising the steps of:
   a) imprinting a printed material with data;
   b) imprinting the printed material with a bar code containing the data;
   c) scanning the bar-encoded information with a portable pen-shaped bar code reader having a removable cap;
   d) storing the read data in said cap;
   e) downloading the read data from the reader to a computer;
   f) sorting the data in the computer; and g) generating an output of the sorted data.

8. A system for reading, storing and using data from an encoded printed material, comprising:
   a) a printed material having printed data and a bar code containing said data, said data being divided into discrete fields;
   b) a portable pen-shaped bar code reader adapted to read said bar code;
   c) said reader including means for storing and downloading the read data to said computer;
   d) said reader is pen-shaped having a removable cap; and
   e) said cap including said storage and downloading means.
   c) a computer coupled to said reader for storing and manipulating said data with respect to said fields and providing an output report.

9. A portable bar code reader, comprising:
   a) a pen-shaped housing including a removable cap;
   b) a scanner disposed within said housing;
   c) means disposed within said cap for storing the scanned data; and
   d) means associated with said cap for downloading the stored data into a computer.

10. A portable bar code reader as in claim 9, wherein:
    a) said housing includes a power supply for said scanner.

11. A portable bar code reader as in claim 9, wherein:
    a) said cap includes a power supply for said storing means.

* * * * *